United States Patent
Bressanelli et al.

(10) Patent No.: US 10,037,240 B2
(45) Date of Patent: Jul. 31, 2018

(54) TIMESTAMP REPAIR MECHANISM IN CASE OF DECOMPRESSION FAILURE

(71) Applicant: QUALCOMM Incorporated, San Diego, CA (US)

(72) Inventors: Dominique Francois Bressanelli, Eschborn (DE); Saket Bathwal, Hyderabad (IN); Deepak Sah, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 59 days.

(21) Appl. No.: 14/864,685

(22) Filed: Sep. 24, 2015

(65) Prior Publication Data
US 2017/0091014 A1    Mar. 30, 2017

(51) Int. Cl.
| | | |
|---|---|---|
| G06F 11/07 | (2006.01) | |
| H04W 8/30 | (2009.01) | |
| H04L 29/06 | (2006.01) | |
| H04W 28/06 | (2009.01) | |

(52) U.S. Cl.
CPC ...... G06F 11/0793 (2013.01); G06F 11/0709 (2013.01); G06F 11/0751 (2013.01); H04L 69/04 (2013.01); H04L 69/22 (2013.01); H04W 8/30 (2013.01); H04W 28/06 (2013.01)

(58) Field of Classification Search
None
See application file for complete search history.

(56) References Cited

U.S. PATENT DOCUMENTS

| | | | | |
|---|---|---|---|---|
| 7,907,609 B2 * | 3/2011 | Kapoor | ............. | H04L 29/06027 370/389 |
| 7,948,989 B2 * | 5/2011 | Kapoor | ................. | H04L 1/0079 370/394 |
| 8,165,104 B2 * | 4/2012 | Agashe | ................... | H04L 69/04 370/350 |

(Continued)

FOREIGN PATENT DOCUMENTS

WO    WO 2009030062 A1 *    3/2009    ............. H04L 69/04

OTHER PUBLICATIONS

ISA/EP, International Search Report and Written Opinion of the International Searching Authority, Int'l Application No. PCT/US2016/053289, dated Nov. 22, 2016, European Patent Office, Rijswijk, NL, 11 pgs.

*Primary Examiner* — Justin R Knapp
(74) *Attorney, Agent, or Firm* — Holland & Hart LLP/Qualcomm

(57) ABSTRACT

Methods, systems, and devices may implement a header repair mechanism to deal with a loss of successive compressed headers (e.g., due to radio interface). The present methods and apparatus exploit the fact that once a correct timestamp (TS) from a previous decompression success (called "last successfully decomp_TS") is known, another (e.g., a subsequent) TS should be in the form: last successfully decomp_TS+n*min_TS_STRIDE, where n is a positive integer if the estimated sequence number (SN) is higher than the last successfully decompressed SN, and a negative integer if the estimated SN is lower than the last successfully decompressed SN, and min_TS_STRIDE is the expected minimum TS increment, which is known and directly related to the medium sample rate and frame rate, for example.

30 Claims, 8 Drawing Sheets

(56) References Cited

U.S. PATENT DOCUMENTS

| | | | |
|---|---|---|---|
| 8,418,037 B2* | 4/2013 | Li | H04L 69/04 714/702 |
| 2006/0187846 A1* | 8/2006 | Pelletier | H04W 28/06 370/252 |
| 2007/0258458 A1* | 11/2007 | Kapoor | H04L 1/0079 370/394 |
| 2010/0205497 A1 | 8/2010 | Li et al. | |

* cited by examiner

TIMESTAMP REPAIR MECHANISM IN CASE OF DECOMPRESSION FAILURE

BACKGROUND

Field of the Disclosure

The following relates generally to wireless communication, and more specifically to a timestamp repair mechanism in case of decompression failure.

Description of Related Art

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

A wireless communication system (e.g., 3rd Generation Partnership Project (3GPP), Long Term Evolution (LTE), etc.) may use robust header compression (RoHC) to provide header information in an efficient manner. For example, when voice data is transmitted in a conventional Internet Protocol (IP) format, voice packets may be carried via Real-time Transport Protocol (RTP) or User Datagram Protocol (UDP). RTP/UDP/IP messages have a relatively large header overhead (e.g., greater than the voice data payload). Bandwidth utilization may be improved by using RoHC to compress the RTP/UDP/IP header.

RoHC divides the header into a static section including information that does not change between adjacent packets during transmission (e.g., IP address, port number, etc.) and a dynamic section including information that changes for each packet (e.g., sequence number (SN), timestamp (TS), IP identifier (IP-ID), etc.). A compressor at an upstream device (e.g., a base station) and a decompressor at a downstream device (e.g., UE), for example, both store a context for each data stream. Absent a decompression failure, the compressor includes the static section of the header only in the initial message of the data stream, while the dynamic section is included in further compressed messages. Thus, the decompressor decompresses the initial message to obtain the static information and the dynamic information, and decompresses subsequent messages to obtain only dynamic information.

RoHC may use a Window-based Least Significant Bits (WLSB) algorithm to compress the SN, TS and IP-ID, which change relatively little between packets of a data stream. In general, the WLSB algorithm provides the lowest k bits of an original field value for transmission instead of the whole original field value, with the compressor and decompressor storing a reference value for the field in the context for the data stream. The decompressor restores the original field value using the reference value and the received k bits. The decompressor searches in an interpretation interval for a decoded value with the same lowest k bits as the received k bits.

When a loss of successive compressed headers transmitted by the upstream device occurs (e.g., due to radio interface) such that a new compressed header that carries unscaled TS bits is received by the downstream device, for example, decompression of the header may fail. As described herein, there is a need for improving header recovery to reduce re-initialization and re-synchronization, which otherwise may lead to loss of packets and a poor compression rate.

SUMMARY

The present disclosure provides a header repair mechanism to deal with a loss of successive compressed headers (e.g., due to radio interface). The present methods and apparatus exploit the fact that once a correct timestamp (TS), such as a Real-Time Transport Protocol TS, from a previous decompression success (called "last successfully decompressed TS") is known, a subsequent timestamp should be in the form: last successfully decompressed TS+n*minimum TS_STRIDE, where n is a positive integer if the estimated sequence number (SN) is higher than the last successfully decompressed SN, and a negative integer if the estimated SN is lower than the last successfully decompressed SN, and minimum TS_STRIDE is the expected minimum TS increment, which is known and directly related to the medium sample rate and frame rate.

A method of wireless communication is described. The method may include receiving a compressed header, determining that a decompression failure has occurred for the compressed header, determining that a decompressed TS associated with the decompression failure is outside of a predetermined interpretation window and attempting to repair the decompressed TS based at least in part on the determination that the decompressed TS is outside of the predetermined interpretation window.

An apparatus for wireless communication is described. The apparatus may include means for receiving a compressed header, means for determining that a decompression failure has occurred for the compressed header, means for determining that a decompressed TS associated with the decompression failure is outside of a predetermined interpretation window and means for attempting to repair the decompressed TS based at least in part on the determination that the decompressed TS is outside of the predetermined interpretation window.

A further apparatus is described. The apparatus may include a processor, memory in electronic communication with the processor, and instructions stored in the memory. The instructions may be operable to cause the processor to receive a compressed header, determine that a decompression failure has occurred for the compressed header, determine that a decompressed TS associated with the decompression failure is outside of a predetermined interpretation window and attempt to repair the decompressed TS based at least in part on the determination that the decompressed TS is outside of the predetermined interpretation window.

A non-transitory computer readable medium for wireless communication is described. The non-transitory computer-readable medium may include instructions to cause a processor to receive a compressed header, determine that a decompression failure has occurred for the compressed header, determine that a decompressed TS associated with the decompression failure is outside of a predetermined interpretation window and attempt to repair the decompressed TS based on the determination that the decompressed TS is outside of the predetermined interpretation window.

In some examples of the method, apparatus, or non-transitory computer-readable medium described above, determining that the decompressed TS is outside of the predetermined interpretation window comprises determining that the decompressed TS is outside of a window based at least on a TS value of a most recent successfully decompressed header and a number of bits in the received compressed header for a compressed unscaled TS value.

In some examples of the method, apparatus, or non-transitory computer-readable medium described above, determining that the decompressed TS is outside of the predetermined interpretation window comprises determining that the decompressed TS conforms to a predetermined format.

In some examples of the method, apparatus, or non-transitory computer-readable medium described above, determining that the decompressed TS conforms to the predetermined format comprises determining that the decompressed TS is equal to a last successfully decompressed TS plus an integer multiple of a minimum TS_STRIDE.

In some examples of the method, apparatus, or non-transitory computer-readable medium described above, the integer multiple of the minimum TS_STRIDE is a positive integer times the minimum TS_STRIDE.

In some examples of the method, apparatus, or non-transitory computer-readable medium described above, attempting to repair the decompressed TS comprises obtaining a first candidate TS that conforms to a predetermined format and has least significant bits that match those associated with the compressed header.

In some examples of the method, apparatus, or non-transitory computer-readable medium described above, obtaining the first candidate TS that conforms to the predetermined format comprises obtaining the first candidate TS equal to a last successfully decompressed TS plus an integer multiple of a minimum TS_STRIDE.

In some examples of the method, apparatus, or non-transitory computer-readable medium described above, the integer multiple of the minimum TS_STRIDE is a positive integer times the minimum TS_STRIDE.

Some examples of the method, apparatus, or non-transitory computer-readable medium described above may further include processes, features, means, or instructions for attempting to decompress the received header using the first candidate TS.

Some examples of the method, apparatus, or non-transitory computer-readable medium described above may further include processes, features, means, or instructions for determining a successful decompression of the received header using the first candidate TS, as well as processes, features, means, or instructions for updating a last successfully decompressed TS with the first candidate TS.

Some examples of the method, apparatus, or non-transitory computer-readable medium described above may further include processes, features, means, or instructions for determining a successful decompression of the received header using the first candidate TS by determining that a cyclic redundancy check (CRC) of at least the received header using the first candidate TS is satisfied.

Some examples of the method, apparatus, or non-transitory computer-readable medium described above may further include processes, features, means, or instructions for determining an unsuccessful decompression of the received header using the first candidate TS. Some examples may further include processes, features, means, or instructions for determining that no other candidate TSs exist that conform to the predetermined format and have least significant bits that match those associated with the compressed header. Some examples may further include processes, features, means, or instructions for transmitting a negative acknowledgement (NACK) in response to receiving the compressed header.

Some examples of the method, apparatus, or non-transitory computer-readable medium described above may further include processes, features, means, or instructions for determining an unsuccessful decompression of the received header using the first candidate TS. A second candidate TS may be obtained that conforms to the predetermined format and has least significant bits that match those associated with the compressed header. The second candidate TS may be used in attempting to decompress the received header.

Some examples of the method, apparatus, or non-transitory computer-readable medium described above may further include processes, features, means, or instructions for determining a successful decompression of the received header using the second candidate TS. Additionally, some examples may further include processes, features, means, or instructions for updating a last successfully decompressed TS with the second candidate TS.

DETAILED DESCRIPTION

Figure 1:
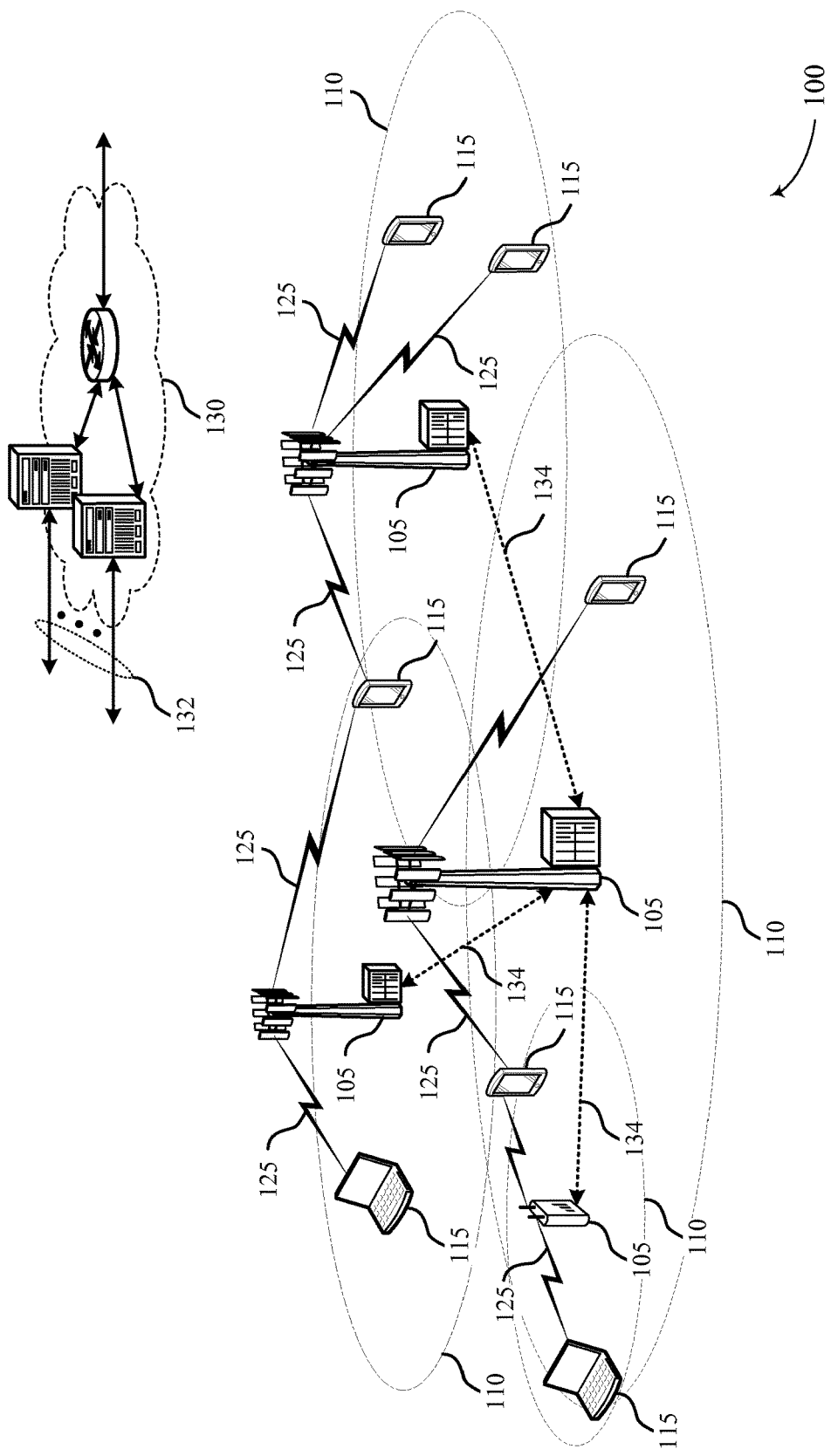
FIG. 1 illustrates an example of a wireless communications system that supports a timestamp repair mechanism in case of decompression failure in accordance with aspects of the present disclosure.

The present disclosure provides a timestamp repair mechanism to deal with a loss of successive compressed headers. Generally, the timestamp (TS) of a packet increases by an integral multiple of some unit or defined parameter (called, for example, "TS_STRIDE") from packet to packet. The decompressor of a downstream device (e.g., user equipment (UE)) is typically aware of the minimum TS_STRIDE for a given flow because the TS_STRIDE has been previously communicated in order to allow the decompressor to decompress a TS. When there is a change of TS_STRIDE (which typically happens on the transition from voice to silence or vice-versa), the compressor of the upstream device (e.g., base station) is mandated to send both the new TS_STRIDE and the least significant bits of the current TS. The decompressor attempts to recover the header based on the least significant bits of the timestamp, and if decompression is successful, the new TS_STRIDE is taken into account for subsequent packets.

In attempting to recover the header, the decompressor uses an interpretation interval, which is based on the last successfully decompressed header and the number of bits used to compress the information. However, in the case of consecutive packet loss, it is possible that the TS sent by the compressor and received by the decompressor is actually outside the interpretation interval. This means that the decompressor ends up estimating an incorrect value of the TS.

If the decompression fails at this stage (e.g., a cyclic redundancy check (CRC) fails), the decompressor may simply send a negative acknowledgement (e.g., NACK) and force the compressor to re-initialize compression by sending uncompressed headers until re-sync is achieved. Such re-initialization and re-sync may involve loss of voice packets and a poor compression rate.

According to the present methods and apparatus, instead of automatically sending the negative acknowledgement when decompression fails, a determination may be made whether the decompressed TS is in an expected form: last successfully decompressed TS+n*minimum TS_STRIDE. If not, a header repair mechanism may instead attempt to find a replacement TS such that the replacement TS conforms to the following format: last successfully decompressed TS+n*minimum TS_STRIDE, and the least significant bits are exactly the ones signaled in the compressed header.

Upon finding such a TS, a header decompression may attempt to use this TS (e.g., repaired timestamp). If the CRC passes, the present methods and apparatus may determine that a re-synchronization has been achieved internally. Therefore, the "last successfully decompressed TS" may be updated to the newly decompressed header and the voice packet may be forwarded to upper layers. If the above-described CRC fails, the repair mechanism may repeat using a next TS found that satisfies the foregoing, and reattempt decompression using the next TS.

Aspects of the disclosure are initially described in the context of a wireless communication system. Aspects of the disclosure are also described with reference to a process flow diagram. Aspects of the disclosure are further illustrated by and described with reference to apparatus diagrams, system diagrams, and flowcharts that relate to timestamp repair in case of decompression failure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Communications between base stations 105, between a base station 105 and a UE 115, and between UEs 115 may be facilitated by header compression (e.g., robust header compression (RoHC)). As such, any one of the base stations 105 or the UEs 115 may be a downstream device that employs a header repair mechanism as described herein. Thus, when a loss of successive compressed headers transmitted, for example, by an upstream device (e.g., a different one of the base stations 105 or the UEs 115) occurs such that a new compressed header that carries unscaled TS bits is received by the downstream device, decompression of the header may fail. Upon determining that the unscaled TS is outside of the interpretation interval, the header repair mechanism may attempt to repair the unscaled TS. If the repair is successful, re-synchronization is achieved internally, e.g., without sending a NACK to cause re-initialization and re-synchronization via the upstream device.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

The minimum TS increment between packets is generally known by the devices (e.g., the base stations 105 and UEs 115) of wireless communications system 100. The minimum TS increment is directly related to the medium sample rate and frame rate of transmissions in the wireless communications system 100. For example, in the case of audio Narrowband AMR (NB-AMR), the sample rate is 8 kHz and one voice frame may cover 20 ms. Furthermore, each voice frame is often carried in one RTP packet. In this case, the RTP TS increment is always n*160 for some integer n, where the "160" is the product of the sample rate and the frame rate (8000 Hz*0.02 s). Note that silence periods have no impact on the TS increment, as the sample clock at the source normally keeps running without changing either frame rate or frame boundaries. Likewise, in the case of Wideband AMR (WB-AMR), the sample rate is 16 kHz and one voice frame also covers 20 ms. Therefore, the RTP TS increment in WB-AMR is always n*320.

The decompressor may decompress a RTP timestamp in accordance with the following equation: TS=TS SCALED*TS_STRIDE+TS OFFSET, where TS_STRIDE is communicated explicitly and TS OFFSET is communicated implicitly to the decompressor. A minimum TS_STRIDE is the TS_STRIDE that was communicated to a UE 115 during voice or video activity. As examples, the expected value of the TS_STRIDE is 160 for NB-AMR, 320 for WB-AMR and 3000 for a video codec whose sample rate is 90 kHz and frame rate 30 frames/s.

If a header information element x is part of the latest successfully decompressed header, the decompressor sets x reference=x and attempts to decompress the next packet, assuming x is within the interpretation interval [x reference−p, x reference+$2^k$−1−p] ([TS minimum, TS maximum]), where k is the number of bits received in the new packet for the compressed value of x and p is a positive integer much smaller than $2^1$. Thus, there are p past values (e.g., smaller values of x compared to the latest decompressed header to allow some re-ordering or late arrival of packets) and $2^k-1-p$ future values within the interpretation interval. However, in the case of consecutive packet loss, it is possible that x sent by the compressor and received by the decompressor is actually bigger than x reference+$2^k-1-p$, meaning that x is thus outside the interpretation interval. In such a case, the decompressor (e.g., UE) may receive the least significant bits of the TS and may erroneously expect the TS to be in the interpretation interval, even though the compressor (e.g., base station) may attempt to send a TS that is greater than TS maximum. This means that the decompressor ends up estimating an incorrect value of x.

Accordingly, the repair mechanism described herein attempts to repair the compressed TS when the TS is outside of the interpretation window. The repair mechanism may be applied to a header information element x such as TS, sequence number (SN) and IP identifier (IP-ID), etc. Thus, it should be understood that the description is set forth in terms of TS as an example.

Figure 2:
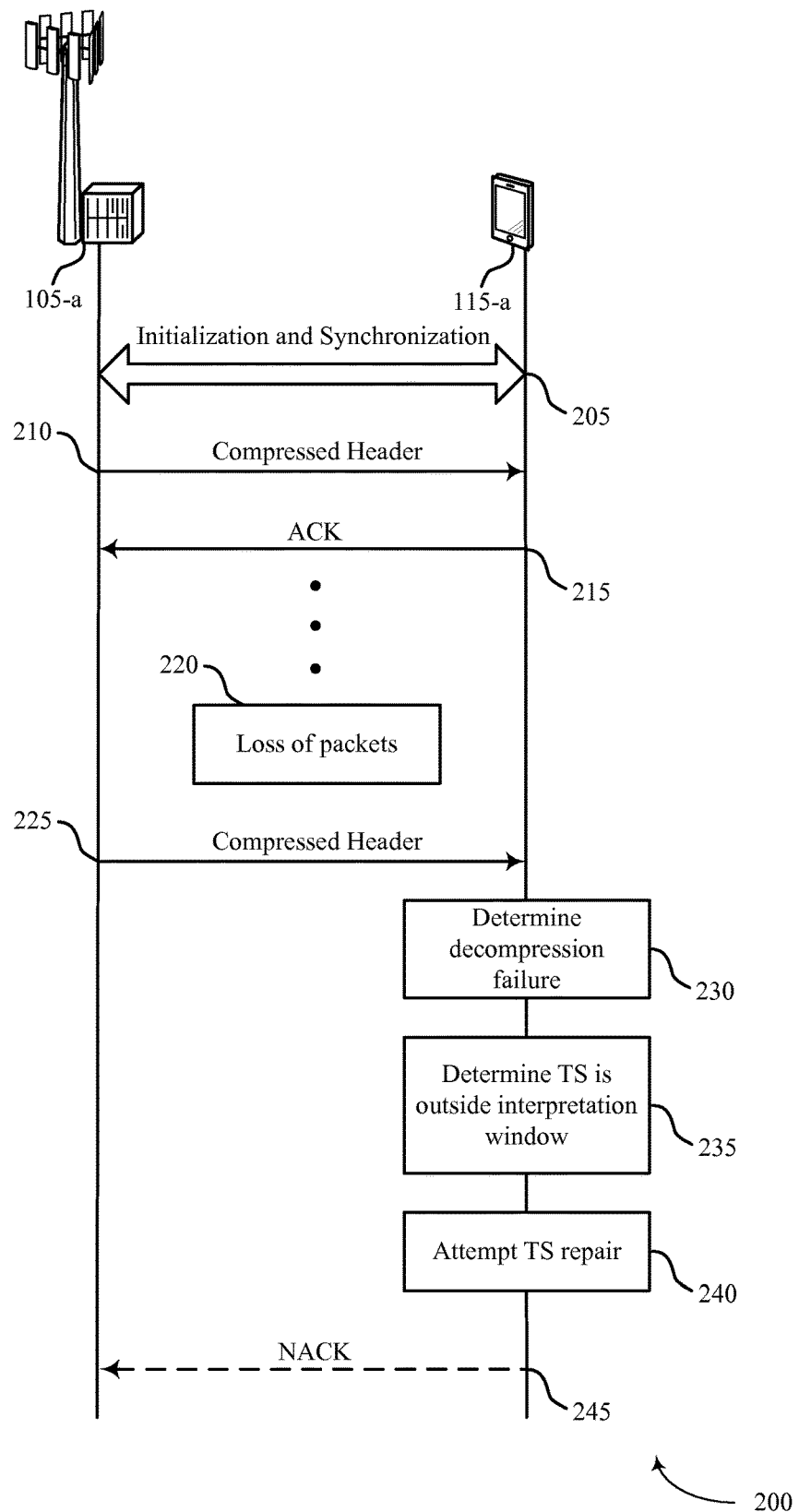
FIG. 2 illustrates an example of a process flow in a system that supports a timestamp repair mechanism in case of decompression failure in accordance with aspects of the present disclosure.

FIG. 2 illustrates an example of a process flow 200 for timestamp repair in case of decompression failure in accordance with various aspects of the present disclosure. Process flow 200 may include base station 105-*a* and UE 115-*a*, which may be examples of the corresponding devices described with reference to FIG. 1. In FIG. 2, the base station 105-*a* is the upstream device (e.g., device transmitting data) and the UE 115-*a* is the downstream device (e.g., device receiving data), for example.

Communications between the base station 105-*a* and the UE 115-*a* begin with a period of initialization and synchronization 205 during which the base station 105-*a* transmits uncompressed headers until synchronization is achieved (e.g., the UE 115-*a* responds with a synchronization acknowledgement). Thereafter, communications sent from the base station 105-*a* to the UE 115-*a* may include a compressed header 210. Upon successfully decompressing the compressed header, the UE 115-*a* may send an acknowledgement (ACK) 215 to the base station 105-*a*.

However, after a loss of packets 220 (e.g., due to interference), a subsequent compressed header 225 received by the UE 115-*a* from the base station 105-*a* may include an unscaled TS. In such case, the UE 115-*a* may determine a decompression failure at block 230 (e.g., via CRC). Upon determining the decompression failure, the UE 115-*a* may determine whether the received TS is outside of an interpretation window at block 235. In aspects, if not, the UE 115-*a* may send a NACK (not shown) to the base station 105-*a*, resulting in re-initialization and re-synchronization (also not shown).

The interpretation window considered at block 235 may be given by the range [TS minimum, TS maximum]. TS minimum may be indicated by the quantity (x reference–p), where x reference is equal to a header information element x, and where p is a positive integer much smaller than $2^k$ (k is the number of bits received in the new packet for the compressed value of x). TS maximum may be indicated by the quantity (x reference+$2^k-1-p$). Thus, there are p past values (e.g., smaller values of x compared to the latest decompressed header to allow some re-ordering or late arrival of packets) and $2^k-1-p$ future values within the interpretation window.

When the received TS is outside the interpretation window, the UE attempts to repair the TS (at block 240), as described further herein. If the repair is successful, communications from the base station 105-*a* to the UE 115-*a* may continue using compressed headers. If repair of the TS cannot be made, then the UE 115-*a* may send a NACK 245 to the base station 105-*a* for re-initialization and re-synchronization.

The determination that the TS may be outside of the predetermined interpretation window (at block 235) may include determining whether the decompressed TS conforms to a predetermined format. In some cases, determining that the decompressed TS conforms to the predetermined format involves determining that the decompressed timestamp is equal to a last successfully decompressed timestamp plus an integer multiple of a minimum TS_STRIDE. In some cases, the integer multiple of the minimum TS_STRIDE is a positive integer times the minimum TS_STRIDE. The predetermined format may also be written as follows: last successfully decompressed TS+n*minimum TS_STRIDE.

If the decompressed TS is determined to be outside of the predetermined interpretation window, TS repair may be attempted (at block 240). To repair the decompressed TS, a first candidate TS is obtained. The first candidate TS may conform to a predetermined format and have least significant bits that match those associated with the compressed header. In some cases, obtaining the first candidate TS that conforms to the predetermined format involves obtaining the first candidate TS equal to a last successfully decompressed timestamp plus an integer multiple of a minimum TS_STRIDE. In some cases, the integer multiple of the minimum TS_STRIDE is a positive integer times the minimum TS_STRIDE.

Once the first candidate TS is obtained, the UE 115-*a* may attempt to decompress the received header using the first candidate TS. If successful, the last successfully decompressed TS is replaced with the first candidate TS. If the decompression attempt is not successful, then one or more additional candidate TSs may be determined and tested, with each of them conforming to the predetermined format and having least significant bits that match those associated with the compressed header.

Figure 3:
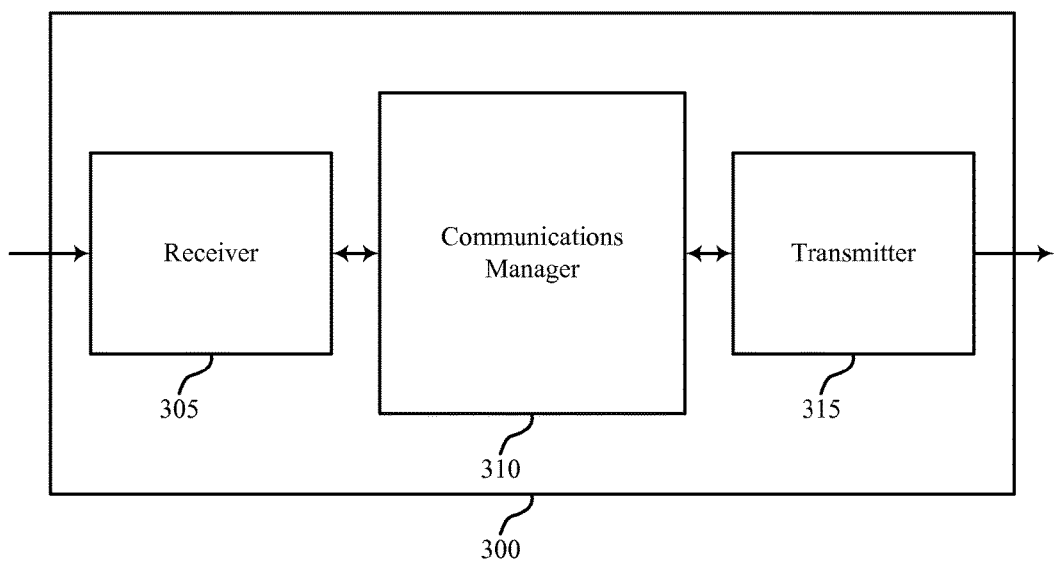
FIGS. 3 and 4 show block diagrams of a wireless device that supports a timestamp repair mechanism in case of decompression failure in accordance with aspects of the present disclosure.

FIG. 3 shows a block diagram of a wireless device 300 that supports timestamp repair in case of decompression failure in accordance with various aspects of the present disclosure. Wireless device 300 may be an example of aspects of a UE 115 or base station 105 described with reference to FIGS. 1 and 2. Wireless device 300 may include receiver 305, communications manager 310 and transmitter 315. Wireless device 300 may also include a processor. Each of these components may be in communication with each other.

The receiver 305 may receive information such as packets, user data, or control information associated with various information channels (e.g., control channels, data channels, and information related to timestamp repair mechanism in case of decompression failure, etc.). Information may be passed on to other components of the device. The receiver 305 may be an example of aspects of the transceiver 525 described with reference to FIG. 5.

The communications manager 310 may receive a compressed header, determine that a decompression failure has occurred for the compressed header, determine that a decompressed timestamp associated with the decompression failure is outside of a predetermined interpretation window, and attempt to repair the decompressed timestamp based at least in part on the determination that the decompressed timestamp is outside of the predetermined interpretation window. The communications manager 310 may also be an example of aspects of the communications management module 505 described with reference to FIG. 5.

The transmitter 315 may transmit signals received from other components of wireless device 300. In some examples, the transmitter 315 may be collocated with a receiver in a transceiver module. For example, the transmitter 315 may be an example of aspects of the transceiver 525 described with reference to FIG. 5. The transmitter 315 may include a single antenna, or it may include a plurality of antennas.

Figure 4:
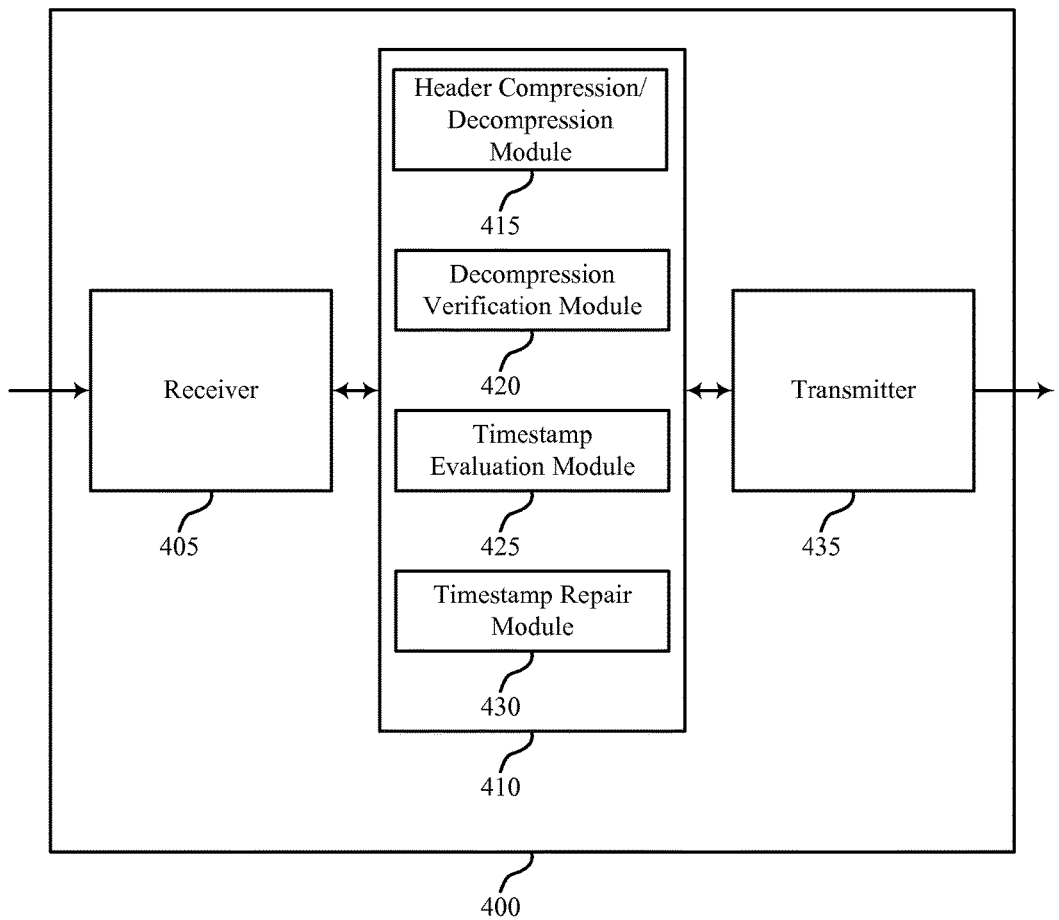

FIG. 4 shows a block diagram of a wireless device 400 that supports timestamp repair in case of decompression failure in accordance with various aspects of the present disclosure. Wireless device 400 may be an example of aspects of a wireless device 300 or a UE 115 or base station 105 described with reference to FIGS. 1, 2 and 3. Wireless device 400 may include receiver 405, communications manager 410 and transmitter 435. Wireless device 400 may also include a processor. Each of these components may be in communication with each other.

The receiver 405 may receive information which may be passed on to other components of the device. The receiver 405 may also perform the functions described with reference to the receiver 305 of FIG. 3. The receiver 405 may be an example of aspects of the transceiver 525 described with reference to FIG. 5.

The communications manager 410 may be an example of aspects of communications manager 310 described with reference to FIG. 3. The communications manager 410 may include header compression/decompression module 415, decompression verification module 420, timestamp evaluation module 425 and timestamp repair module 430. The communications manager 410 may be an example of aspects of the communications management module 505 described with reference to FIG. 5.

The header compression/decompression module 415 may receive a compressed header via the receiver 405, and decompress the received header. Decompression is performed based on stored context and reception of the compressed packet, which contains changes on a set of dynamic fields. Changes on other fields may be predicted from the explicitly updated fields present in compressed.

The decompression verification module 420 may determine that a decompression failure has occurred for the compressed header (e.g., via CRC). Each compressed packet may include a CRC with a number of bits that depends on the compressed packet type. The CRC may be computed on full header (IP/UDP/RTP) before compression (e.g., at the compressor side). After a decompression attempt, the decompression verification module 420 may detect failure when the computed CRC on full decompressed header is different from CRC received from the compressor.

The timestamp evaluation module 425 may determine that a decompressed timestamp associated with the decompression failure is outside of a predetermined interpretation window. In some cases, determining that the decompressed timestamp is outside of the predetermined interpretation window is based at least on a timestamp value of a most recent successfully decompressed header and a number of bits in the received compressed header for a compressed unscaled timestamp value. In some cases, determining that the decompressed timestamp is outside of the predetermined interpretation window involves determining that the decompressed timestamp conforms to a predetermined format. In some cases, determining that the decompressed timestamp conforms to the predetermined format involves determining that the decompressed timestamp is equal to a last successfully decompressed timestamp plus an integer multiple of a minimum TS_STRIDE. In some cases, the integer multiple of the minimum TS_STRIDE is a positive integer times the minimum TS_STRIDE. The predetermined format may also be written as follows: last successfully decompressed TS+n*minimum TS_STRIDE.

The timestamp repair module 430 may attempt to repair the decompressed timestamp based at least in part on the determination that the decompressed timestamp is outside of the predetermined interpretation window. To repair the decompressed timestamp, the timestamp repair module 430 obtains a first candidate TS that conforms to a predetermined format and has least significant bits that match those associated with the compressed header. In some cases, obtaining the first candidate timestamp that conforms to the predetermined format involves obtaining the first candidate timestamp equal to a last successfully decompressed timestamp plus an integer multiple of a minimum TS_STRIDE. In some cases, the integer multiple of the minimum TS_STRIDE is a positive integer times the minimum TS_STRIDE.

Once the first candidate timestamp is obtained, the timestamp repair module 430 attempts to decompress the received header using the first candidate timestamp. If the decompression verification module 420 determines a successful decompression of the received header using the first candidate timestamp (e.g., via CRC), the header compression/decompression module 415 updates a last successfully decompressed timestamp with the first candidate timestamp. If the decompression verification module 420 determines an unsuccessful decompression of the received header using the first candidate timestamp, the timestamp repair module 430 may obtain a second candidate TS that conforms to the predetermined format and has least significant bits that match those associated with the compressed header. The timestamp repair module 430 then attempts to decompress the received header using the second candidate timestamp, and so on.

If the timestamp repair module 430 determines that no or no other candidate timestamps exist that conform to the predetermined format and have least significant bits that match those associated with the compressed header, or a threshold number of repair attempts has been satisfied, the communications manager 410 transmits a negative acknowledgement in response to receiving the compressed header.

The transmitter 435 may transmit signals received from other components of wireless device 400. In some examples, the transmitter 435 may be collocated with a receiver in a transceiver module. For example, the transmitter 435 may be an example of aspects of the transceiver 525 described with reference to FIG. 5. The transmitter 435 may utilize a single antenna, or it may utilize a plurality of antennas.

Figure 5:
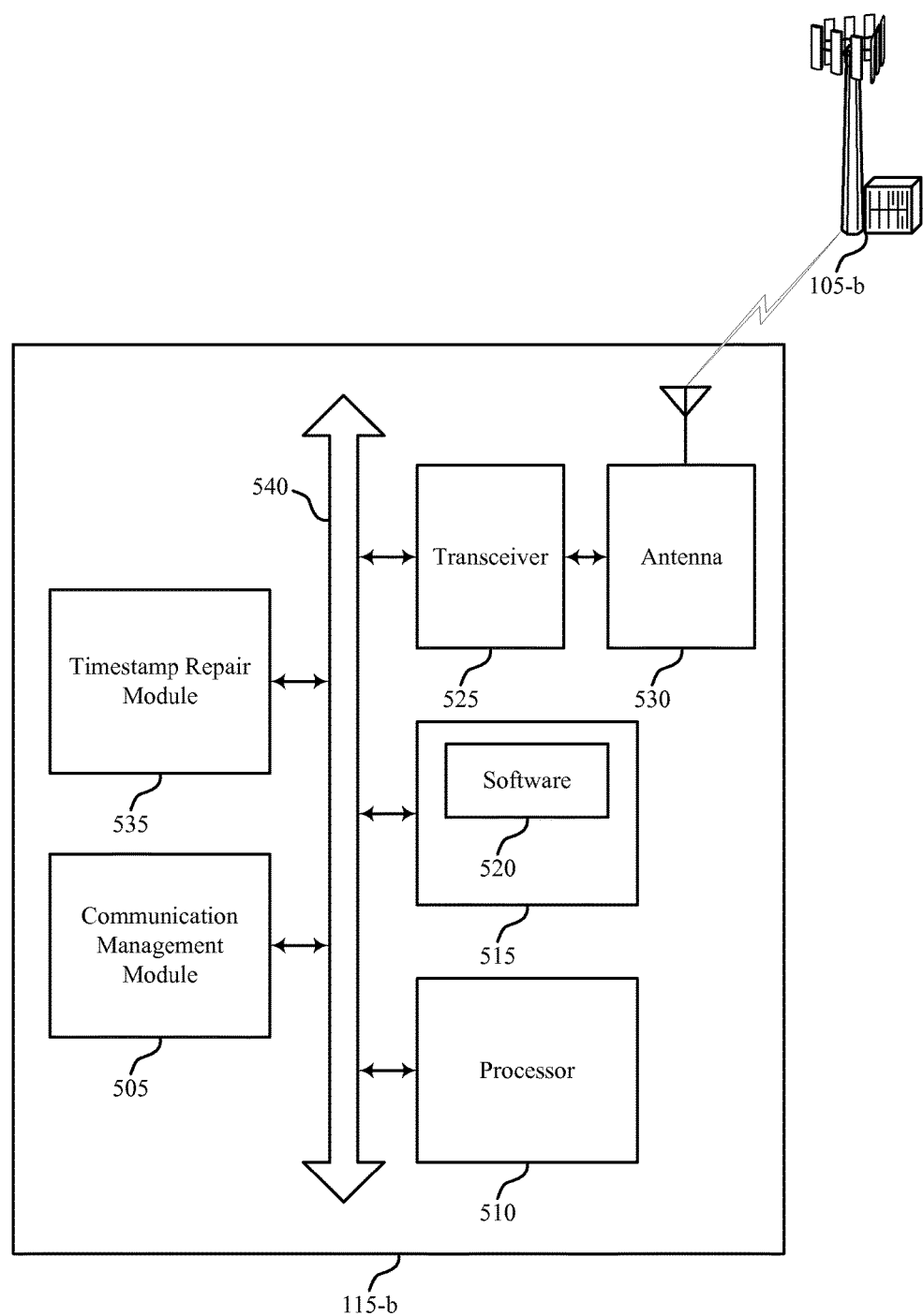
FIG. 5 illustrates a block diagram of a system including a UE that supports a timestamp repair mechanism in case of decompression failure in accordance with aspects of the present disclosure.

FIG. 5 shows a diagram of a system 500 including a device that supports timestamp repair in case of decompression failure in accordance with various aspects of the present disclosure. For example, system 500 may include UE 115-*b*, which may be an example of a wireless device 300, a wireless device 400, or a UE 115 as described with reference to FIGS. 1 through 4.

UE 115-*b* may also include communications management module 505, processor 510, memory 515, transceiver 525, antenna 530 and timestamp repair module 535. Each of these modules may communicate, directly or indirectly, with one another (e.g., via one or more buses) 540.

The communication management module 505 may be an example of a communications manager as described with reference to FIGS. 3 and 4. The processor 510 may include an intelligent hardware device, (e.g., a central processing unit (CPU), a microcontroller, an application specific integrated circuit (ASIC), etc.). The memory 515 may include random access memory (RAM) and read only memory (ROM). The memory 515 may store computer-readable, computer-executable software including one or more instructions that, when executed, cause the processor to perform various functions described herein (e.g., compression/decompression, timestamp repair, etc.). In some cases, the software 520 may not be directly executable by the processor but may cause a computer (e.g., when compiled and executed) to perform functions described herein.

The transceiver 525 may communicate bi-directionally, via one or more antennas, wired, or wireless links, with one or more networks, as described above. For example, the transceiver 525 may communicate bi-directionally with a base station 105 or a UE 115. The transceiver 525 may also include a modem to modulate the packets and provide the modulated packets to the antennas for transmission, and to demodulate packets received from the antennas.

In some cases, the wireless device may include a single antenna 530. However, in some cases the device may have more than one antenna 530, which may be capable of concurrently transmitting or receiving multiple wireless transmissions.

The timestamp repair module 535 may operate in conjunction with the communication management module 505 to perform various operations described herein. For example, timestamp repair module 535 may perform operations described above with respect to the header compression/decompression module 415, decompression verification module 420, timestamp evaluation module 425 and timestamp repair module 430 of FIG. 4 and/or described below with respect to FIGS. 7 and 8.

Figure 6:
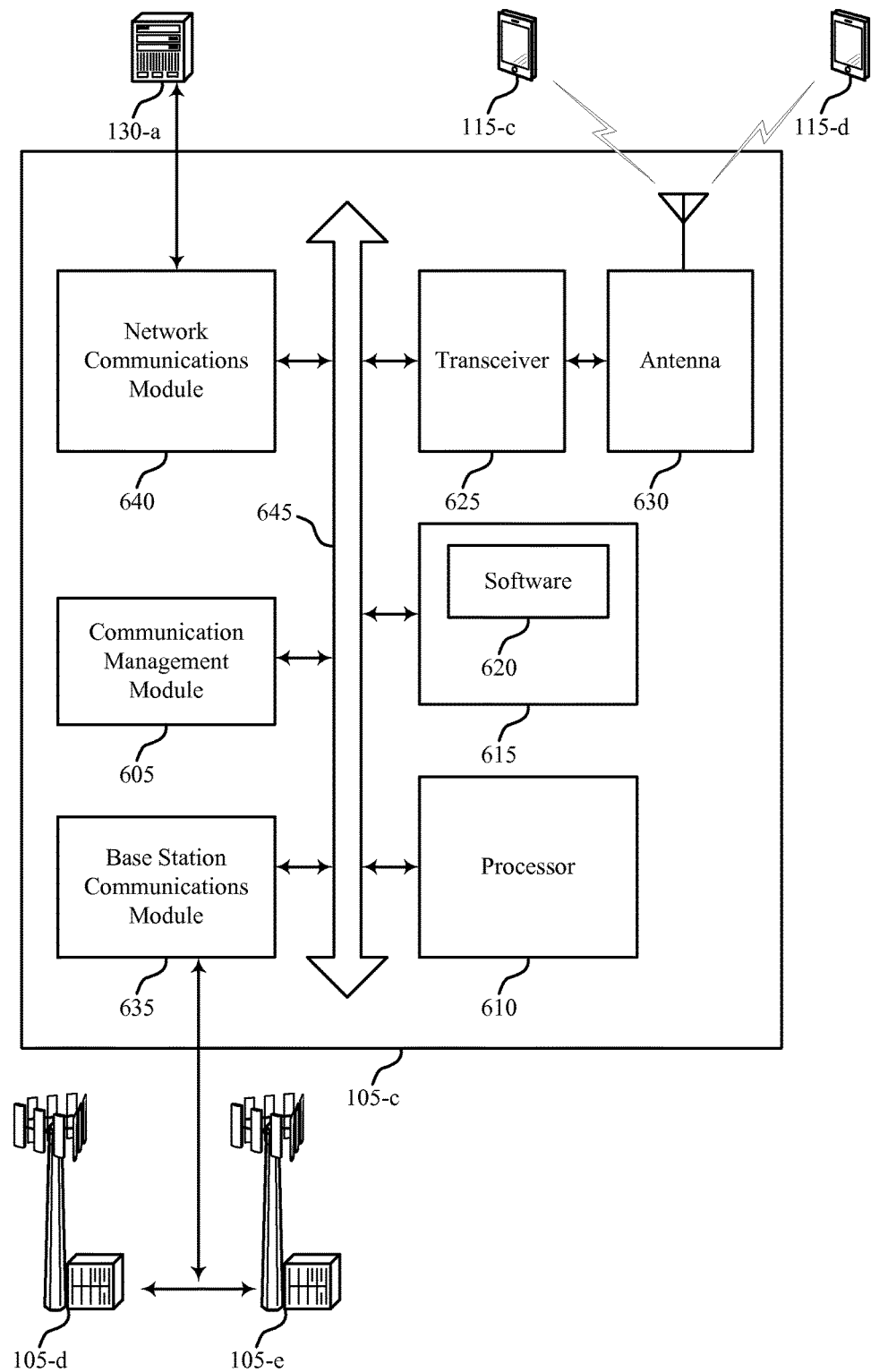
FIG. 6 illustrates a block diagram of a system including a base station that supports a timestamp repair mechanism in case of decompression failure in accordance with aspects of the present disclosure.

FIG. 6 shows a diagram of a wireless system 600 including a device configured that supports timestamp repair in case of decompression failure in accordance with various aspects of the present disclosure. For example, system 600 may include base station 105-c, which may be an example of a wireless device 300, a wireless device 400, or a base station 105 as described with reference to FIGS. 1 through 4. Base station 105-c may also include components for bi-directional voice and data communications including components for transmitting communications and components for receiving communications. For example, base station 105-c may communicate bi-directionally with one or more UEs 115.

Base station 105-c may also include communication management module 605, processor 610, memory 615, transceiver 625, antenna 630, base station communications module 635 and network communications module 640. Each of these modules may communicate, directly or indirectly, with one another (e.g., via one or more buses) 645.

The communication management module 605 may be an example of a communication management module as described with reference to FIGS. 3 and 4. The processor 610 may include an intelligent hardware device, (e.g., a CPU, a microcontroller, an ASIC, etc.). The memory 615 may include RAM and ROM. The memory 615 may store computer-readable, computer-executable software including one or more instructions that, when executed, cause the processor to perform various functions described herein (e.g., timestamp repair mechanism in case of decompression failure, etc.). In some cases, the software 620 may not be directly executable by the processor but may cause a computer (e.g., when compiled and executed) to perform functions described herein.

The transceiver 625 may communicate bi-directionally, via one or more antennas, wired, or wireless links, with one or more networks, as described above. For example, the transceiver 625 may communicate bi-directionally with a base station 105 or a UE 115. The transceiver 625 may also include a modem to modulate the packets and provide the modulated packets to the antennas for transmission, and to demodulate packets received from the antennas.

In some cases, the wireless device may include a single antenna 630. However, in some cases the device may have more than one antenna 530, which may be capable of concurrently transmitting or receiving multiple wireless transmissions.

The base station communications module 635 may manage communications with other base station 105, and may include a controller or scheduler for controlling communications with UEs 115 in cooperation with other base stations 105. For example, the base station communications module 635 may coordinate scheduling for transmissions to UEs 115 for various interference mitigation techniques such as beamforming or joint transmission. In some examples, base station communications module 635 may provide an X2 interface within an LTE/LTE-A wireless communication network technology to provide communication between base stations 105.

The network communications module 640 may manage communications with the core network (e.g., via one or more wired backhaul links). For example, the network communications module 640 may manage the transfer of data communications for client devices, such as one or more UEs 115.

Figure 7:
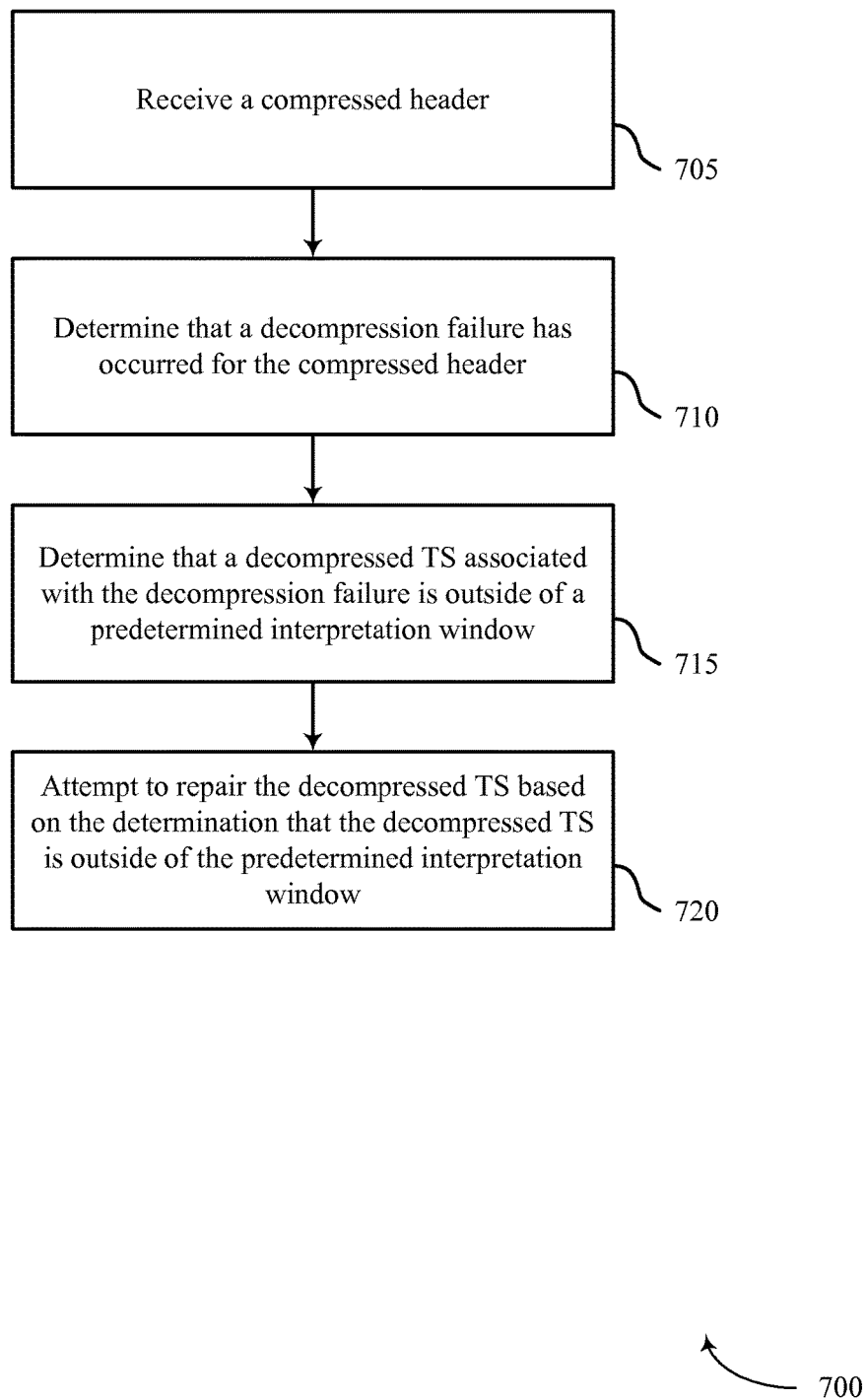
FIGS. 7 and 8 illustrate exemplary methods for timestamp repair in case of decompression failure in accordance with aspects of the present disclosure.

FIG. 7 shows a flowchart illustrating a method 700 for timestamp repair in case of decompression failure in accordance with various aspects of the present disclosure. The operations of method 700 may be implemented by a UE 115 or base station 105 or its components as described with reference to FIGS. 1 and 2. For example, the operations of method 700 may be performed by the communications manager or the communication management module as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 705, the UE 115 or base station 105 may receive a compressed header as described above with reference to FIG. 2. In certain examples, the operations of block 705 may be performed by the header compression/decompression module 415 as described with reference to FIG. 4.

At block 710, the UE 115 or base station 105 may determine that a decompression failure has occurred for the compressed header as described above with reference to FIG. 2. In certain examples, the operations of block 710 may be performed by the decompression verification module 420 as described with reference to FIG. 4.

At block 715, the UE 115 or base station 105 may determine that a decompressed TS associated with the decompression failure is outside of a predetermined interpretation window as described above with reference to FIG. 2. In certain examples, the operations of block 715 may be performed by the timestamp evaluation module 425 as described with reference to FIG. 4.

At block 720, the UE 115 or base station 105 may attempt to repair the decompressed TS based on the determination that the decompressed TS is outside of the predetermined interpretation window as described above with reference to FIG. 2. In certain examples, the operations of block 720 may be performed by the timestamp repair module 430 as described with reference to FIG. 4.

Figure 8:
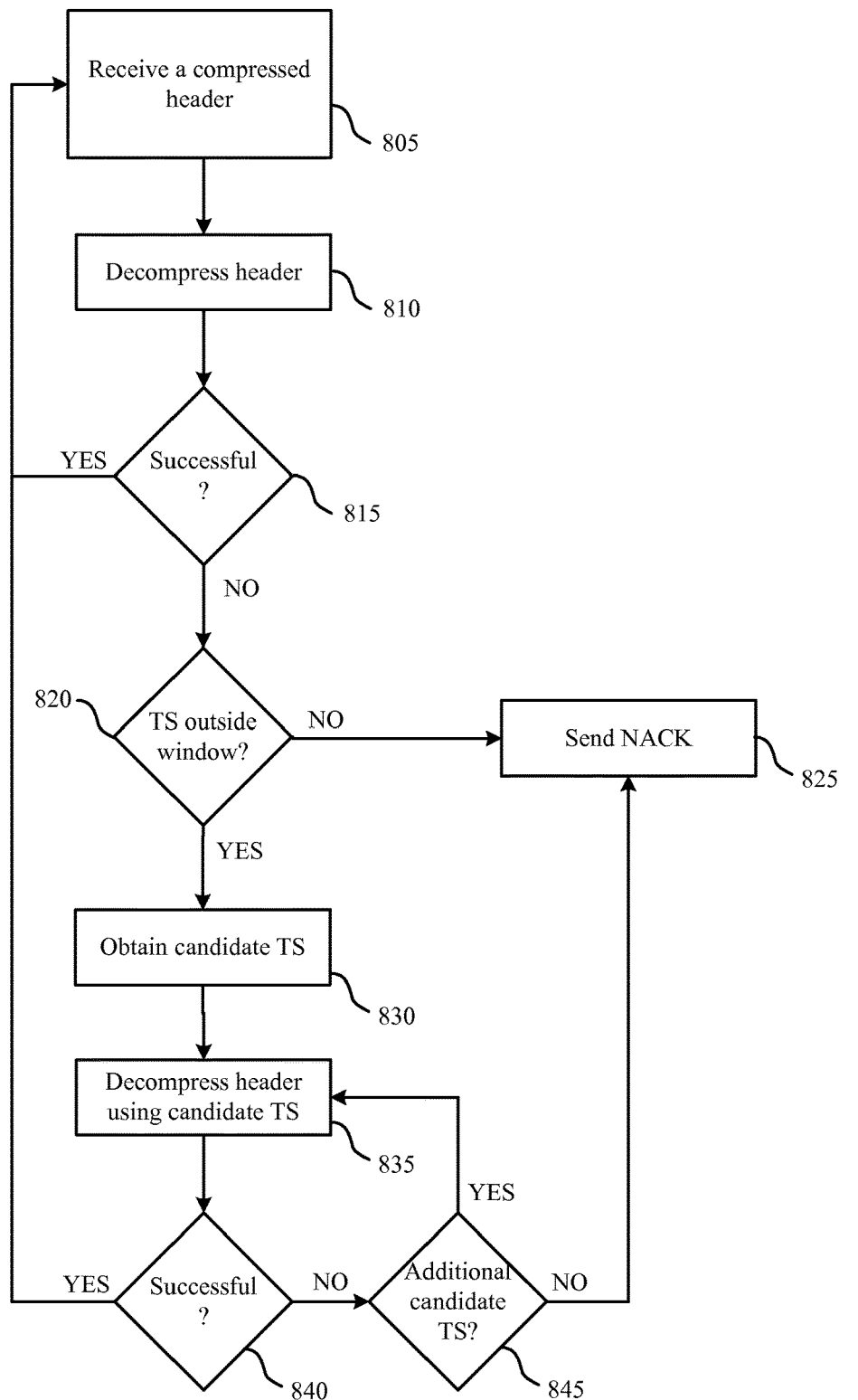

FIG. 8 shows a flowchart illustrating a method 800 for timestamp repair in case of decompression failure in accordance with various aspects of the present disclosure. The operations of method 800 may be implemented by a UE 115 or base station 105 or its components as described with reference to FIGS. 1 and 2. For example, the operations of method 800 may be performed by the communications manager or the communication management module as described herein. In some examples, the UE 115 or base station 105 may execute a set of codes to control the functional elements of the device to perform the functions described below. Additionally or alternatively, the UE 115 or base station 105 may perform aspects the functions described below using special-purpose hardware.

At block 805, the UE 115 or base station 105 may receive a compressed header as described above with reference to FIG. 2. Then, at block 810, the UE 115 or base station 105 may attempt to decompress the received header. In certain examples, the operations of blocks 805 and 810 may be performed by the header compression/decompression module 415 as described with reference to FIG. 4.

At block 815, the UE 115 or base station 105 may determine whether the decompression at block 810 is successful. In certain examples, the operations of block 815 may be performed by the decompression verification module 420 as described with reference to FIG. 4. If the decompression at block 810 was successful, the method 800 may return to block 805 for the UE 115 or base station 105 to receive a subsequent communication including a compressed header. If the decompression at block 810 was not successful, the UE 115 or base station 105 determines that a decompression failure has occurred for the compressed header as described above with reference to FIG. 2.

If a decompression failure is determined at block 815, the method 800 may continue to block 820, where the UE 115 or base station 105 may determine whether the decompressed TS associated with the decompression failure is outside of a predetermined interpretation window as described above with reference to FIG. 2. In certain examples, the operations of block 820 may be performed by the timestamp evaluation module 425 as described with reference to FIG. 4. If the decompressed TS is not outside the predetermined window, the method 800 may continue to block 825, where the UE 115 or base station 105 sends a NACK in response to receiving the compressed header (block 805). As described above, the NACK may cause the upstream device to re-initialize and re-synchronize for returning to using compressed headers.

If the decompressed TS is not outside the predetermined window, the method 800 may jump to block 830, where the UE 115 or base station 105 obtains a candidate TS. In certain examples, the operations of block 830 may be performed by the timestamp evaluation module 425 as described with reference to FIG. 4.

Then, at block 835, the UE 115 or base station 105 attempts to decompress the received header (block 805) using the candidate TS. In certain examples, the operations of block 835 may be performed by the header compression/decompression module 415 as described with reference to FIG. 4.

At block 840, the UE 115 or base station 105 may determine whether the decompression at block 835 is successful. In certain examples, the operations of block 840 may be performed by the decompression verification module 420 as described with reference to FIG. 4. If the decompression at block 835 was successful, the header has been repaired and re-synchronization has been achieved internally (e.g., at the UE 115 or base station 105, without involving the upstream device). In such case, the method 800 may return to block 805 for the UE 115 or base station 105 to receive a subsequent communication including a compressed header. Although not shown for the sake of simplicity, the UE115 or base station 105 may update a last successfully decompressed TS with the first candidate TS. In certain examples, such operations may be performed by the header compression/decompression module 415 as described with reference to FIG. 4.

If the decompression at block 835 was not successful, the method 800 may continue to block 845, where the UE 115 or base station 105 determines whether an additional candidate TS exists. In certain examples, the operations of block 845 may be performed by the timestamp evaluation module 425 as described with reference to FIG. 4.

If an additional candidate TS exists, the method returns to block 835 to attempt decompression using the additional candidate TS. If no additional candidate TSs exist, the method 800 may return to block 825, where the UE 115 or base station 105 sends a NACK in response to receiving the compressed header (block 805) because repair of the decompressed timestamp was not successful. In aspects, additionally, if a threshold number of repair attempts have been satisfied, the method 800 may return to block 825, where the UE 115 or base station 105 sends a NACK in response to receiving the compressed header (block 805) because repair of the decompressed timestamp was not successful.

Although not shown for the sake of simplicity, it should be understood that if no candidate TSs exist, the method 800 also may continue from block 820 to block 825 because the repair mechanism (e.g., blocks 830-840) cannot be performed without at least one candidate TS. Thus, it should be understood that at least one candidate TS is assumed to exist for the foregoing description.

It should be noted that these methods describe a possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for a timestamp repair mechanism in case of decompression failure.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, "at least one of: a, b, or c" is intended to cover a, b, c, a-b, a-c, b-c, and a-b-c., as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA (FDMA), OFDMA (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-A are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base station of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for timestamp repair mechanism in case of decompression failure. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication performed by a wireless communication device, comprising:
achieving synchronization with a base station via received uncompressed headers and subsequently receiving, by a receiver of the wireless communication device, a compressed header;
determining that a decompression failure has occurred for the received compressed header;
determining that a decompressed timestamp (TS) associated with the decompression failure is outside of a predetermined interpretation interval; and
attempting to repair the decompressed TS based at least in part on the determination that the decompressed TS is outside of the predetermined interpretation interval so as to maintain synchronization with the base station.

2. The method of claim 1, wherein determining that the decompressed TS is outside of the predetermined interpretation interval comprises:
determining that the decompressed TS is outside of the predetermined interpretation interval based at least on a TS value of a most recent successfully decompressed header and a number of bits in the received compressed header for a compressed unscaled TS value.

3. The method of claim 1, wherein determining that the decompressed TS is outside of the predetermined interpretation interval comprises:
determining that the decompressed TS conforms to a predetermined format.

4. The method of claim 3, wherein determining that the decompressed TS conforms to the predetermined format comprises:
determining that the decompressed TS is equal to a last successfully decompressed TS plus an integer multiple of a minimum TS unit (TS_STRIDE).

5. The method of claim 4, wherein
the integer multiple of the minimum TS_STRIDE is a positive or negative integer times the minimum TS_STRIDE.

6. The method of claim 1, wherein attempting to repair the decompressed TS comprises:
obtaining a first candidate TS that conforms to a predetermined format and has least significant bits that match those associated with the received compressed header.

7. The method of claim 6, wherein obtaining the first candidate TS that conforms to the predetermined format comprises:
obtaining the first candidate TS equal to a last successfully decompressed TS plus an integer multiple of a minimum TS unit (TS_STRIDE).

8. The method of claim 7, wherein
the integer multiple of the minimum TS_STRIDE is a positive or negative integer times the minimum TS_STRIDE.

9. The method of claim 6, further comprising:
attempting to decompress the received compressed header using the first candidate TS.

10. The method of claim 9, further comprising:
determining a successful decompression of the received compressed header using the first candidate TS; and
updating a last successfully decompressed TS with the first candidate TS.

11. The method of claim 10, wherein determining the successful decompression of the received compressed header using the first candidate TS comprises:
determining that a cyclic redundancy check (CRC) of at least the received compressed header using the first candidate TS is satisfied.

12. The method of claim 9, further comprising:
determining an unsuccessful decompression of the received compressed header using the first candidate TS;
determining that no other candidate TSs exist that conform to the predetermined format and have least significant bits that match those associated with the received compressed header or a threshold number of repair attempts have been satisfied; and transmitting a negative acknowledgement (NACK) in response to receiving the compressed header.

13. The method of claim 9, further comprising:

determining an unsuccessful decompression of the received compressed header using the first candidate TS;

obtaining a second candidate TS that conforms to the predetermined format and has least significant bits that match those associated with the received compressed header; and attempting to decompress the received compressed header using the second candidate TS.

14. The method of claim 13, further comprising:

determining a successful decompression of the received compressed header using the second candidate TS; and updating a last successfully decompressed TS with the second candidate TS.

15. An apparatus for wireless communication comprising:

means for achieving synchronization with a base station via received uncompressed headers;

means for receiving a compressed header after achieving synchronization;

means for determining that a decompression failure has occurred for the received compressed header;

means for determining that a decompressed timestamp (TS) associated with the decompression failure is outside of a predetermined interpretation interval; and means for attempting to repair the decompressed TS based at least in part on the determination that the decompressed TS is outside of the predetermined interpretation interval so as to maintain synchronization with the base station.

16. The apparatus of claim 15, wherein the means for determining that the decompressed TS is outside of the predetermined interpretation interval comprises:

means for determining that the decompressed TS is outside of the predetermined interpretation interval based at least on a TS value of a most recent successfully decompressed header and a number of bits in the received compressed header for a compressed unscaled TS value.

17. The apparatus of claim 15, wherein the means for determining that the decompressed TS is outside of the predetermined interpretation interval comprises:

means for determining that the decompressed TS conforms to a predetermined format.

18. The apparatus of claim 17, wherein the means for determining that the decompressed TS conforms to the predetermined format comprises:

means for determining that the decompressed TS is equal to a last successfully decompressed TS plus an integer multiple of a minimum TS unit (TS_STRIDE).

19. The apparatus of claim 18, wherein the integer multiple of the minimum TS_STRIDE is a positive or negative integer times the minimum TS_STRIDE.

20. The apparatus of claim 15, wherein the means for attempting to repair the decompressed TS comprises:

means for obtaining a first candidate TS that conforms to a predetermined format and has least significant bits that match those associated with the received compressed header.

21. The apparatus of claim 20, wherein the means for obtaining the first candidate TS that conforms to the predetermined format comprises:

means for obtaining the first candidate TS equal to a last successfully decompressed TS plus an integer multiple of a minimum TS unit (TS_STRIDE).

22. The apparatus of claim 21, wherein the integer multiple of the minimum TS_STRIDE is a positive or negative integer times the minimum TS_STRIDE.

23. The apparatus of claim 20, further comprising:

means for attempting to decompress the received compressed header using the first candidate TS.

24. The apparatus of claim 23, further comprising:

means for determining a successful decompression of the received compressed header using the first candidate TS; and means for updating a last successfully decompressed TS with the first candidate TS.

25. The apparatus of claim 24, wherein the means for determining the successful decompression of the received compressed header using the first candidate TS comprises:

means for determining that a cyclic redundancy check (CRC) of at least the received header using the first candidate TS is satisfied.

26. The apparatus of claim 23, further comprising:

means for determining an unsuccessful decompression of the received compressed header using the first candidate TS;

means for determining that no other candidate TSs exist that conform to the predetermined format and have least significant bits that match those associated with the compressed header or a threshold number of repair attempts have been satisfied; and means for transmitting a negative acknowledgement (NACK) in response to receiving the compressed header.

27. The apparatus of claim 23, further comprising:

means for determining an unsuccessful decompression of the received compressed header using the first candidate TS;

means for obtaining a second candidate TS that conforms to the predetermined format and has least significant bits that match those associated with the received compressed header; and means for attempting to decompress the received compressed header using the second candidate TS.

28. The apparatus of claim 27, further comprising:

means for determining a successful decompression of the received compressed header using the second candidate TS; and means for updating a last successfully decompressed TS with the second candidate TS.

29. A non-transitory computer-readable medium storing code for wireless communication, the code comprising one or more instructions executable to:

achieve synchronization with a base station via received uncompressed headers;

receive a compressed header after achieving synchronization;

determine that a decompression failure has occurred for the received compressed header;

determine that a decompressed timestamp (TS) associated with the decompression failure is outside of a predetermined interpretation interval; and attempt to repair the decompressed TS based at least in part on the determination that the decompressed TS is outside of the predetermined interpretation interval so as to maintain synchronization with the base station.

30. An apparatus for wireless communication comprising:
a communication manager to achieve synchronization with a base station via received uncompressed headers;
a receiver to receive a compressed header;
a decompression verifier to determine that a decompression failure has occurred for the received compressed header;
a timestamp evaluator to determine that a decompressed timestamp (TS) associated with the decompression failure is outside of a predetermined interpretation interval; and
a timestamp repairer to attempt repair of the decompressed TS based at least in part on the determination that the decompressed TS is outside of the predetermined interpretation interval so as to maintain synchronization with the base station.

* * * * *